(12) United States Patent
Schobben et al.

(10) Patent No.: US 7,847,786 B2
(45) Date of Patent: Dec. 7, 2010

(54) MULTI-VIEW DISPLAY

(75) Inventors: Daniel Willem Elisabeth Schobben, Eindhoven (NL); Piotr Wilinski, Eindhoven (NL); Martinus Hermanus Wilhelmus Maria Van Delden, Eindhoven (NL); Cees Van Berkel, Hove (GB)

(73) Assignee: Koninklijke Philips Electronics, N.V., Eindhoven (NL)

(*) Notice: Subject to any disclaimer, the term of this patent is extended or adjusted under 35 U.S.C. 154(b) by 996 days.

(21) Appl. No.: 10/548,242

(22) PCT Filed: Feb. 27, 2004

(86) PCT No.: PCT/IB2004/050159

§ 371 (c)(1),
(2), (4) Date: Sep. 6, 2005

(87) PCT Pub. No.: WO2004/081777

PCT Pub. Date: Sep. 23, 2004

(65) Prior Publication Data

US 2006/0279528 A1  Dec. 14, 2006

(30) Foreign Application Priority Data

Mar. 10, 2003  (EP) .................................. 03100596

(51) Int. Cl.
*G09G 5/00*  (2006.01)
(52) U.S. Cl. ............................. 345/156; 345/7; 345/158
(58) Field of Classification Search .................... 345/7, 345/156, 157, 158; 351/224; 359/462
See application file for complete search history.

(56) References Cited

U.S. PATENT DOCUMENTS

| 5,867,223 A | | 2/1999 | Schindler et al. |
| 5,883,739 A | * | 3/1999 | Ashihara et al. ............ 359/462 |
| 5,959,612 A | | 9/1999 | Breyer et al. |
| 6,069,649 A | | 5/2000 | Hattori |
| 6,133,944 A | | 10/2000 | Braun et al. |

(Continued)

FOREIGN PATENT DOCUMENTS

EP  0571702 A2  12/1993

(Continued)

OTHER PUBLICATIONS

Cees Van Berkel: P-55.1: 3D Touchless Display Interaction, May 2002, pp. 1-4.

(Continued)

*Primary Examiner*—Amare Mengistu
*Assistant Examiner*—Jennifer Zubajlo

(57) ABSTRACT

A display system has a display device arranged to generate a first view in a first direction relative to the display device and to generate a second view in a second direction relative to the display device, the second direction being different from the first direction, and a device that detects the hand position of at least one user or of a pointing device held by the hand of such user, the position relative to the display device, the user-input being arranged to control the first view and the second view on basis of the detection and an observation mechanism for observation of the, at least one user and arranged to detect whether the user-input is provided to control the first view or the second view, on basis of the observation.

18 Claims, 11 Drawing Sheets

U.S. PATENT DOCUMENTS

Figure 1:
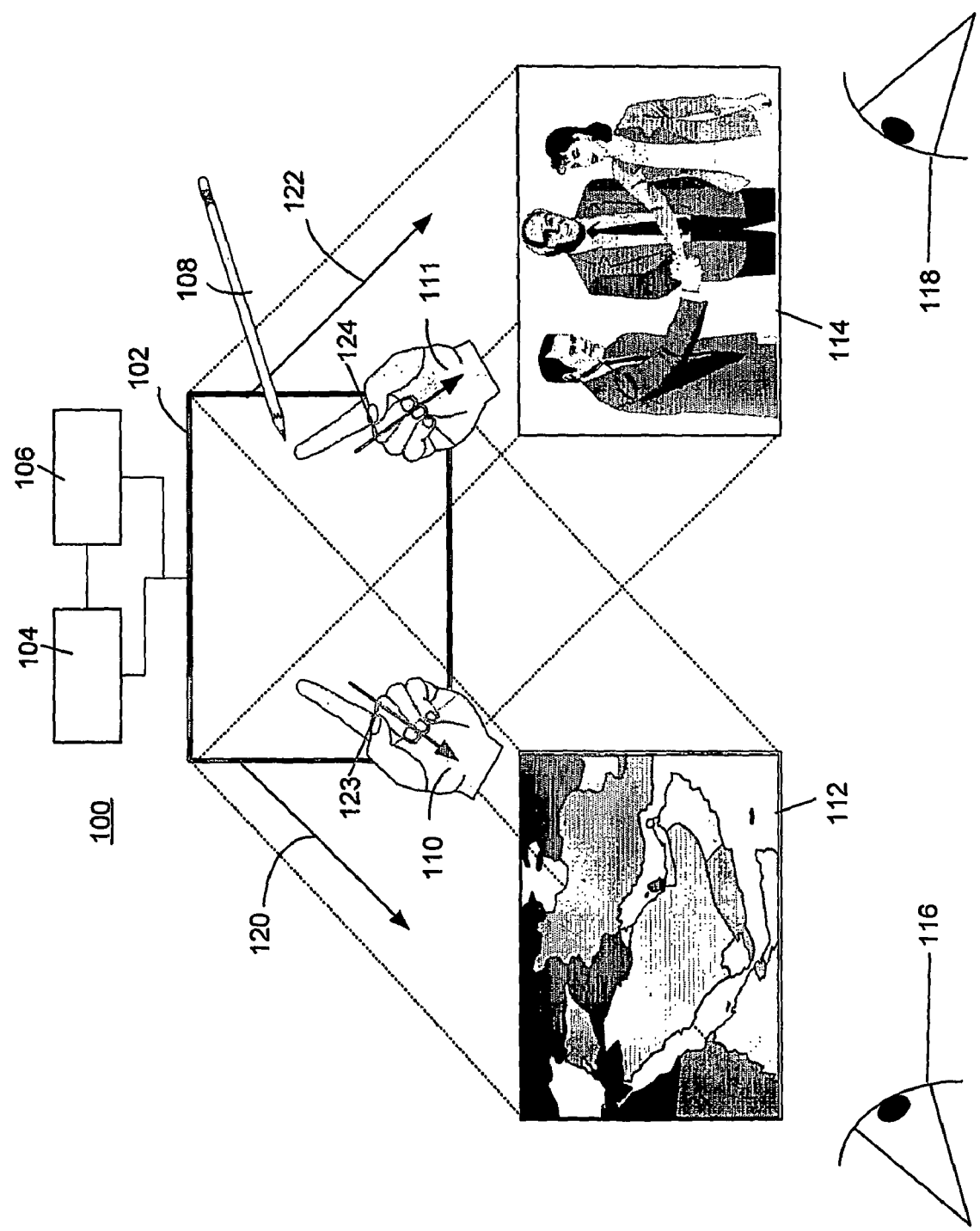

| | | | |
|---|---|---|---|
| 6,890,077 B2* | 5/2005 | Dunn | 351/224 |
| 2002/0024500 A1* | 2/2002 | Howard | 345/158 |
| 2003/0038754 A1* | 2/2003 | Goldstein et al. | 345/7 |

FOREIGN PATENT DOCUMENTS

| | | |
|---|---|---|
| EP | 0931574 A1 | 7/1999 |
| JP | 07103784 A * | 4/1995 |
| JP | 08152992 A * | 6/1996 |
| WO | 0147247 A2 | 6/2001 |
| WO | 0220110 A1 | 3/2002 |

OTHER PUBLICATIONS

J. Segen, et al: Driving a 3D Articulated Hand Model in Real-Time Using Video Input, Jul. 1998.

* cited by examiner

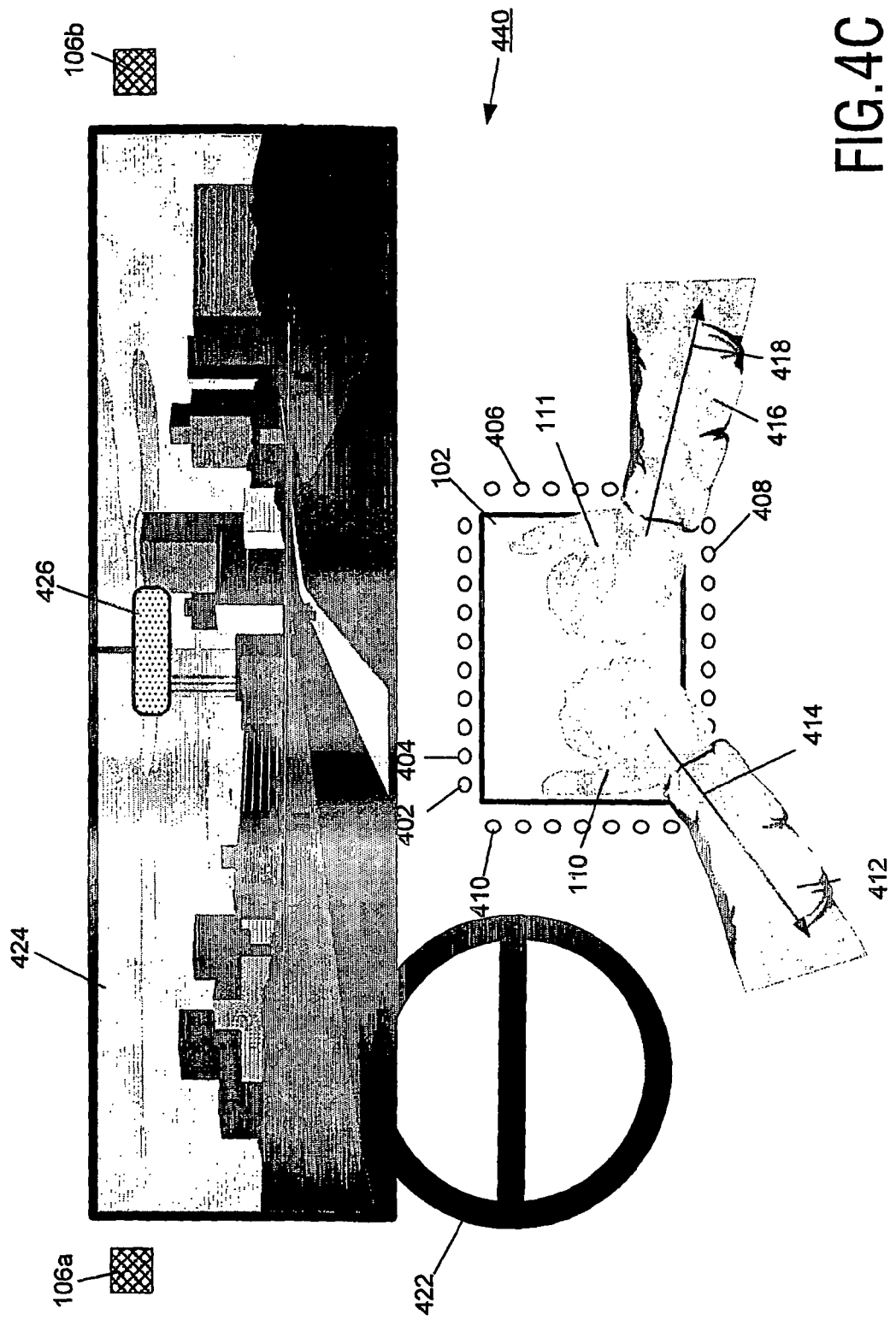

MULTI-VIEW DISPLAY

This application claims the priority of European Patent Application 03100596.0, filed on Mar. 10, 2003, in the European Patent Office.

The invention relates to a display system, comprising:
- a display device being arranged to generate a first view in a first direction relative to the display device and to generate a second view in a second direction relative to the display device, the second direction being different from the first direction; and
- user-input means for accepting user-input by means of detecting a position of a hand of an user or of a pointing device held by the hand, the position relative to the display device, the user-input means being arranged to control the first view and the second view on basis of the detection.

The invention further relates to an apparatus comprising such a display system.

The invention further relates to a vehicle comprising such a display system.

An embodiment of the unit of the kind described in the opening paragraph is known from the article "3D Touchless Display Interaction", by C. van Berkel, in SID Proceedings International Symposium, vol. 33, number 2, pp 1410-1413, 2002. In this article a display system is disclosed comprising a display device and means for detecting hand and finger movements in the neighborhood of the display device. The detection of the hand and finger movements is based on measuring changes of the strength of an electric field which is generated by means of a number of electrodes. An application, which runs on the display system, is controlled on basis of the detected finger and/or hand positions. The application is arranged to generate a sequence of images which are provided to the display device which is designed to create a view on basis of the sequence of images.

The known display system might comprise a 2D display device, but it might also comprise a 3D display device. A 3D display device is arranged to create multiple views, each of which has its own direction relative to the display device. In general, a first one of the views is to be observed by the left eye of an user and a second one of the views is to be observed by the right eye of the user, giving the user an enhanced depth impression.

In the case of an appropriate design, i.e. correct dimensions and disposal of optical elements and light generating elements, it is possible to generate multiple views with one display device, whereby the angle between a first direction of a first view and a second direction of a second view is relatively large. In patent application EP 02078417.9 of 19 Aug. 2002 this is disclosed. Typically the views are not related to the same content then. That means e.g. that the first view corresponds with an image being generated by a first application and that the second view corresponds with another image being generated by a second application. For example the first application corresponds to a movie and the second application corresponds to a car navigation program. Both applications might be running for one single user which is alternatingly watching the first view and the second view. However, it also possible that there are multiple users, each of them watching one of the views being generated by the display device.

If there are multiple applications running and each of them has to be controlled by means of user-input which is accepted and processed by the means for detecting hand and finger movements then a problem occurs: for which of the applications is the user input provided?

It is an object of the invention to provide a display system of the kind described in the opening paragraph which is arranged to accept user-inputs for multiple applications corresponding to the first and second view, respectively.

This object of the invention is achieved in that the display system in further comprising observation means for observation of the user and for detecting whether the userinput is provided to control the first view or the second view, on basis of the observation and the first direction. By observation of the user the display system according to the invention is arranged to determine which of the generated views are visible by that user. It is assumed that the user wants to control the application corresponding to the view which is visible by that user. Optionally the display system according to the invention is arranged to observe multiple users. E.g. on basis of detection of the presence of the hand of the user being located left from the display device the display system is arranged to control the view in the left direction. Alternatively on basis of detection of the presence of the hand of the user being located right from the display device the display system is arranged to control the view in the right direction.

In an embodiment of the display system according to the invention, the observation means are arranged to determine an orientation of the hand of the user relative to the display device and to determine whether a first angle between the orientation of the hand and the first direction is less than a first predetermined threshold. The orientation of the hand is in general related to the position of the user relative to the display device and thus related to the direction of one of the views of the display device. Determination of the orientation of the hand relative to the display device is relatively easy and robust. See for example the article "Driving a 3D Articulated Hand Model in Real-Time using video Input", by J. Segen and S. Kumar, in proceedings of Tenth Image and Multidimensional Digital Signal Processing Workshop, Alpbach, Austria, July 1998.

Optionally the first predetermined threshold is equal to another angle which is determined between the orientation of the hand and the second direction. In other words, the orientation of the hand is compared with the first direction corresponding to the first view and the second direction corresponding to the second view. The minimum difference corresponds with the best matching view.

Preferably the observation means are also arranged to determine an orientation of the wrist and/or lower arm of the user relative to the display device and to determine whether a second angle between the orientation of the wrist and/or lower arm and the first direction is less than a second predetermined threshold. By taking into account these parts of the arm, a relatively robust method of estimating the position of the user is achieved. It should be noted that in typical situations a first user will be located left from the display device and a second user will be located right from the display device. If a lower arm is detected left from the display device then most probably this arm belongs to the first user and if a lower arm is detected right from the display device then most probably this arm belongs to the right user. In the former case, control of the application corresponding to the left view will be performed and in the latter case, control of the application corresponding to the right view will be performed.

Optionally the second predetermined threshold is equal to another angle which is determined between the orientation of the wrist and/or lower arm of the user relative to the display device and the second direction. In other words, the orientation of the wrist and/or lower arm of the user relative to the display device is compared with the first direction corresponding to the first view and the second direction corresponding to the second view. The minimum difference corresponds with the best matching view.

In an embodiment of the display system according to the invention, the observation means comprise computing means to compute a trajectory of the hand on basis of a number of detected positions of the hand and to determine whether a third angle between a vector which represents the trajectory of the hand, and the first direction is less than a third predetermined threshold. By tracking the position of the hand a good estimation of the position of the user is achieved. This is based on the assumption that an user moves his hand in the direction to the display device in order to control the display system.

Optionally the third predetermined threshold is equal to another angle which is determined between the vector which represents the trajectory of the hand and the second direction. In other words, the vector which represents the trajectory of the hand is compared with the first direction corresponding to the first view and the second direction corresponding to the second view. The minimum difference corresponds with the best matching view.

In an embodiment of the display system according to the invention, the observation means are arranged to determine the position of the eyes of the user relative to the display device and to determine whether a fourth angle between a direction of a vector from the display device to a first one of the eyes and the first direction is less than a fourth predetermined threshold. This embodiment according to the invention is particularly interesting for appliance in a hand-held device. E.g. by imaging the environment of the handheld device, the position of the user relative to the display device is determined. On basis of this relative position, the direction of the vector from the display device to the first one of the eyes is computed.

Optionally the fourth predetermined threshold is equal to another angle which is determined between the vector from the display device to a first one of the eyes and the second direction. In other words, the vector from the display device to a first one of the eyes is compared with the first direction corresponding to the first view and the second direction corresponding to the second view. The minimum difference corresponds with the best matching view.

By detecting both the position of the eyes of the user and of parts of his arm a relative accurate and robust distinction between user-inputs is achieved.

Optionally some of the above mentioned predetermined thresholds are mutually equal.

In an embodiment of the display system according to the invention, the observation means comprise optical means for imaging the user. Optical means might be one or more cameras and computing means for image analysis.

In an embodiment of the display system according to the invention, the observation means are arranged to observe the user on basis of acoustic, ultraviolet or radio frequency waves. Preferably these type of observation means are located adjacent to the display device. By means of sending and receiving e.g. ultra-sound the presence of a hand or lower arm in the neighborhood of the display device can relatively easily be detected. With other types of waves, e.g. electromagnetic or ultra-violet waves a similar type of detection can be performed. An advantage of these type of observation means is that they are relatively cheap. Another advantage of these type of observation means is that they are relatively robust.

In an embodiment of the display system according to the invention, the observation means are arranged to observe the user on basis of measuring temperature differences. By means of infra-red sensors the presence of a hand in the neighborhood of the display device can relatively easily be detected. Especially, when multiple infra-red sensors are applied, movement of a hand relative to these sensors can easily be determined, since the local temperature will most probably change because of the movement of the hand in the vicinity of the sensors.

In an embodiment of the display system according to the invention the userinput means comprise the observation means. Alternatively the observation means comprise the user-input means. This means that two functions are performed by the same means. The first function is the detection of the position of the hand relative to the display device in order to control the first view or the second view. The second function is the observation of the user to determine whether the user-input is provided to control the first view or the second view. An advantage of this embodiment according to the invention is a reduction of costs.

It is a further object of the invention to provide an apparatus of the kind described in the opening paragraph, comprising a display system which is arranged to accept user-inputs for multiple applications corresponding to the first and second view, respectively.

This object of the invention is achieved in that the display system further comprises observation means for observation of the user and for detecting whether the userinput is provided to control the first view or the second view, on basis of the observation and the first direction.

The apparatus might be a PDA (personal digital assistant) providing functions to the user like a calendar, calculator, text processor, games, address-book, etcetera. The apparatus might also be a mobile phone, electronic book or laptop.

It is a further object of the invention to provide a vehicle of the kind described in the opening paragraph, comprising a display system which is arranged to accept userinputs for multiple applications corresponding to the first and second view, respectively.

This object of the invention is achieved in that the display system further comprises observation means for observation of the user and for detecting whether the userinput is provided to control the first view or the second view, on basis of the observation and the first direction.

The vehicle might be a car, bus, truck, airplane, train or boat. Typically, two or even more passengers (including the driver or pilot) are seated adjacent to each other in these vehicles. In general, the amount of space for positioning display systems is limited in these vehicles. That means that sharing a display system by multiple passengers is advantageous in these cases. In order to provide each of the passengers with its own image content, a display systems which can generate multiple views is a good solution. The appliance of touchscreens or similar devices as user-input means is advantages in vehicles because of the limited space. Hence, the display system according to the invention is advantageous in vehicles.

Modifications of the display system and variations thereof may correspond to modifications and variations thereof of the apparatus and vehicle described.

Figure 2:
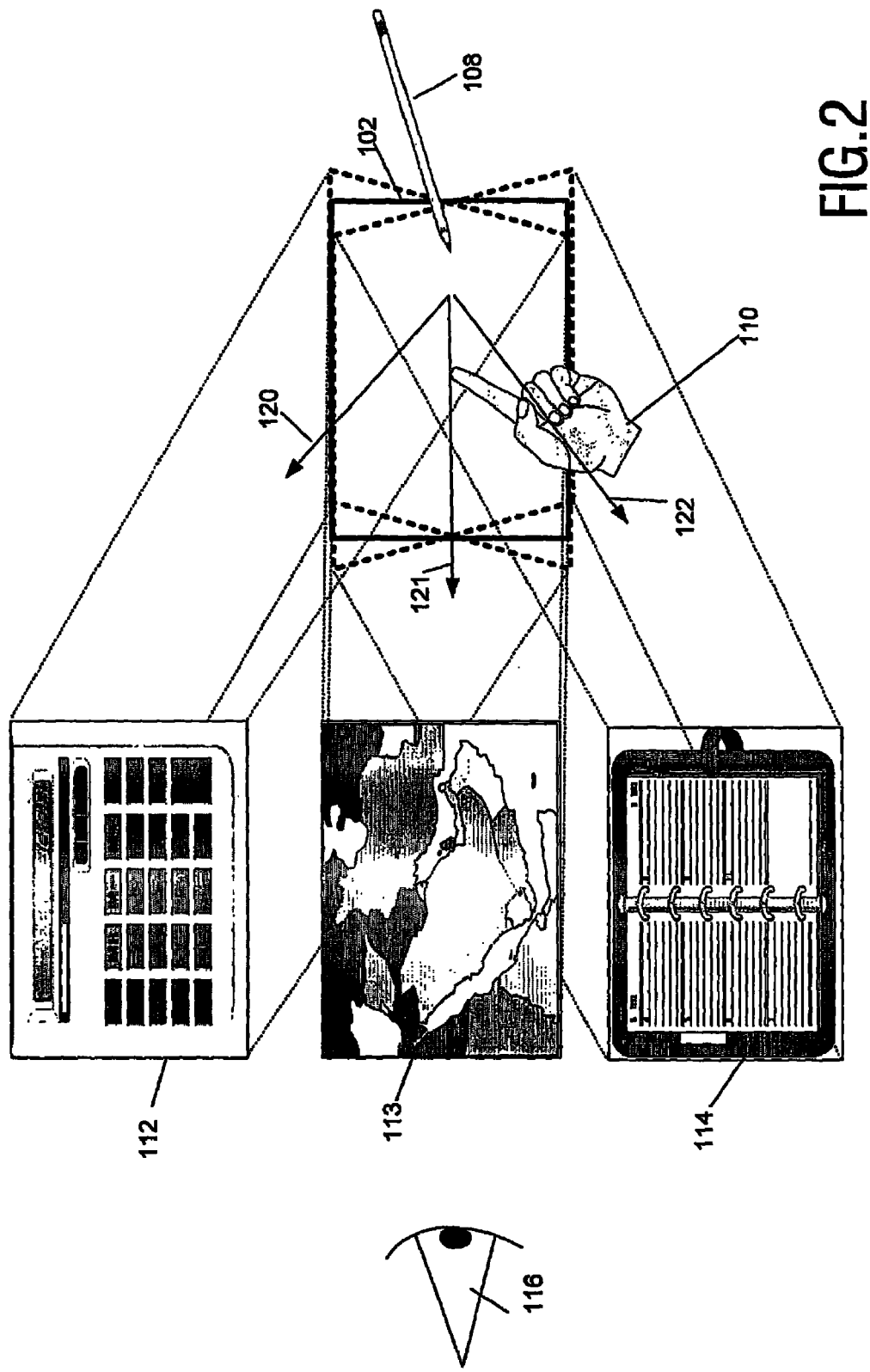
Figure 3A:
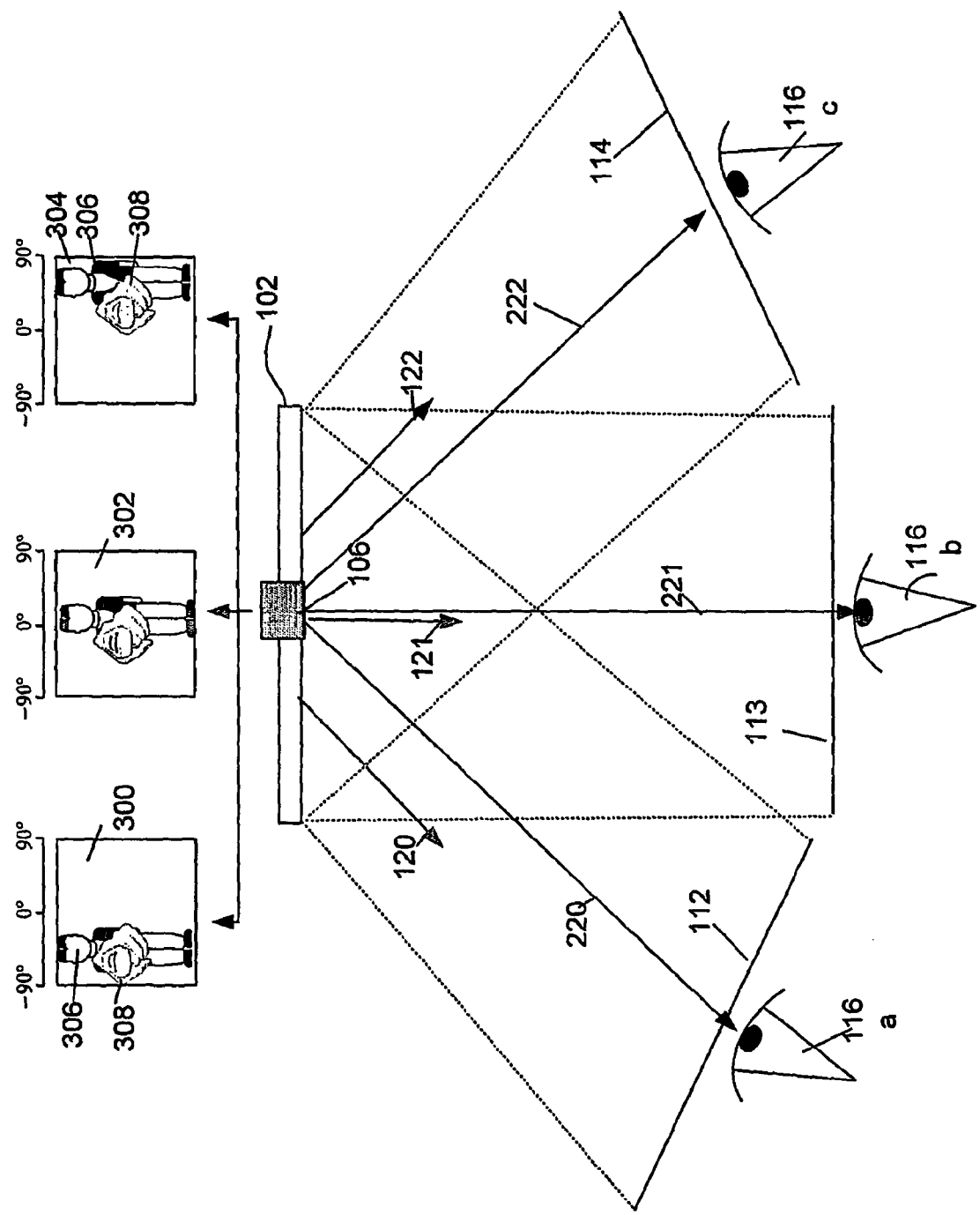
Figure 3B:
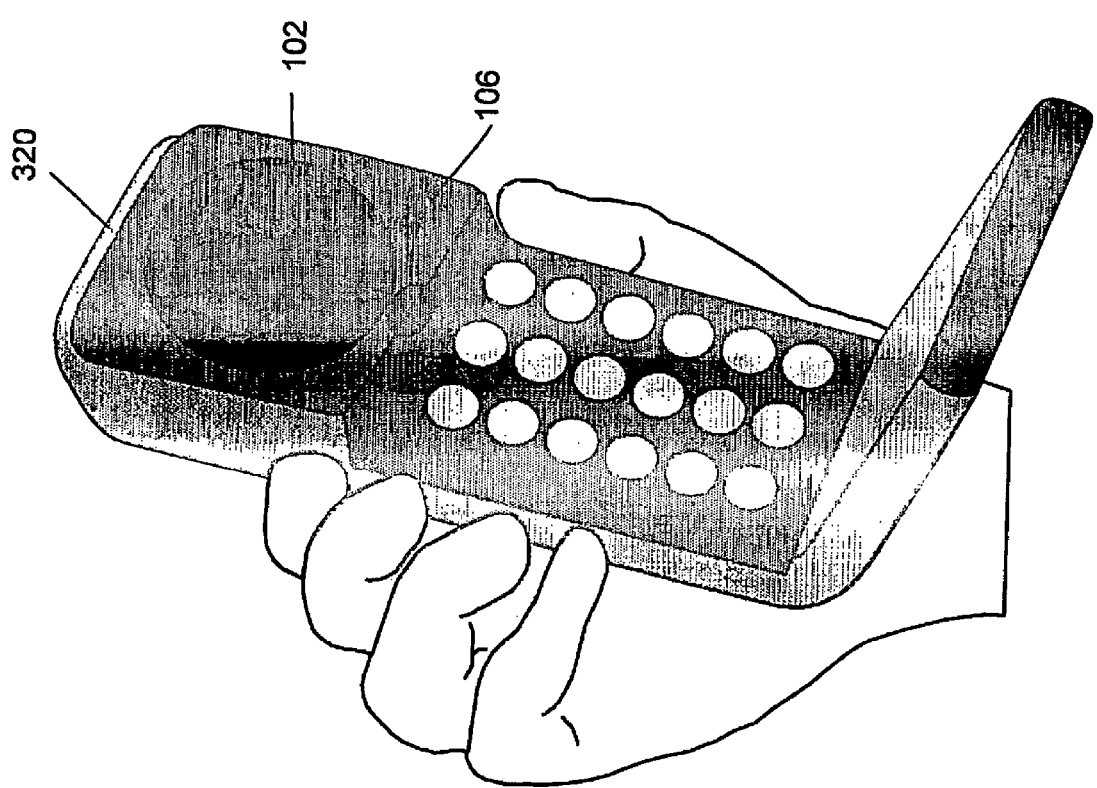
Figure 4A:
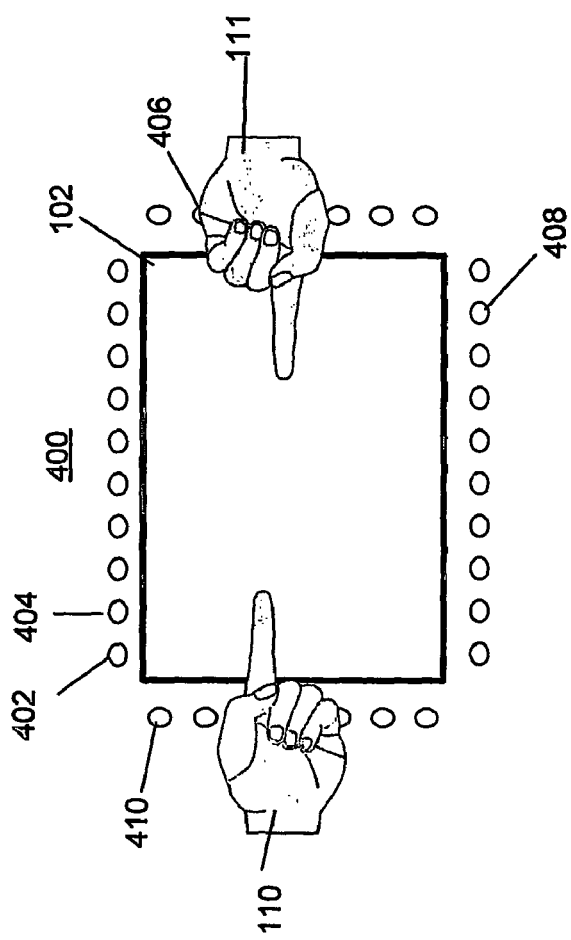
Figure 4B:
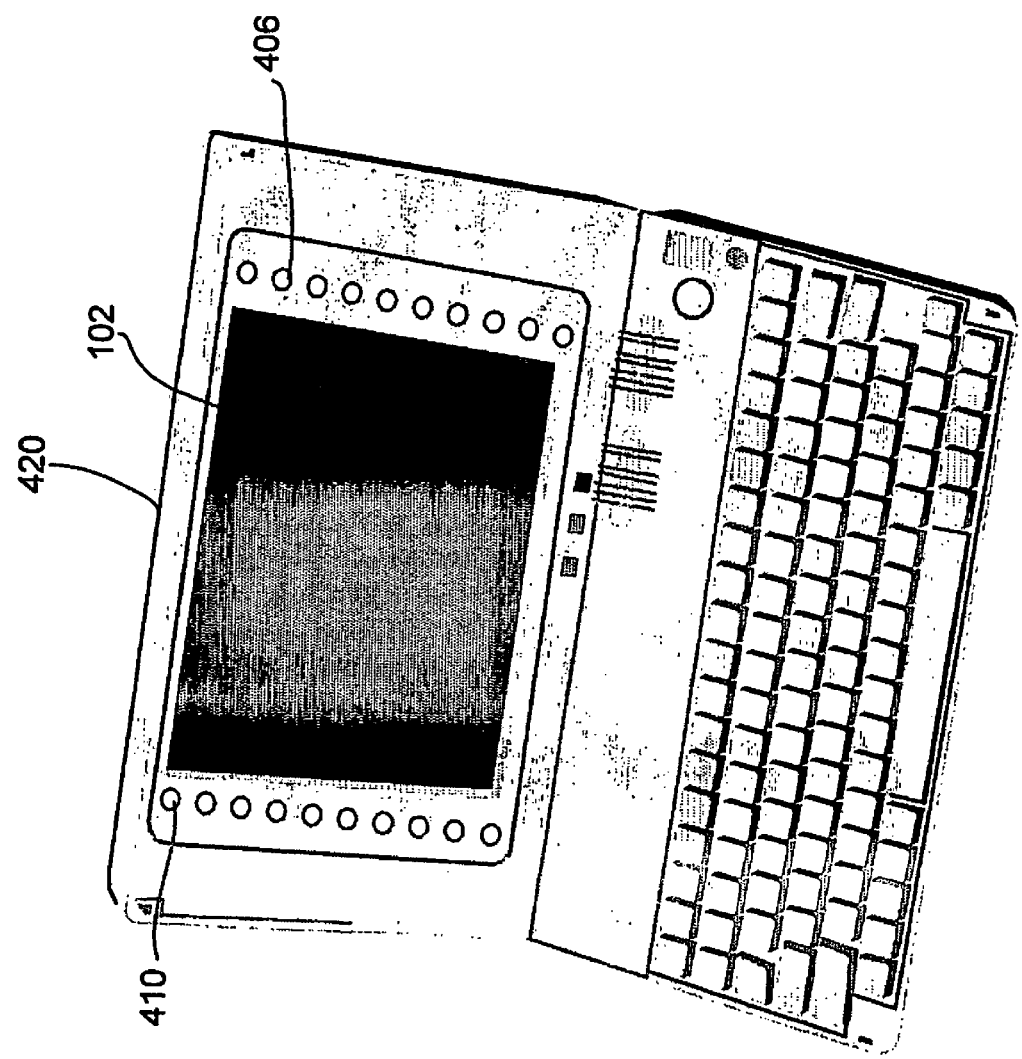
Figure 4D:
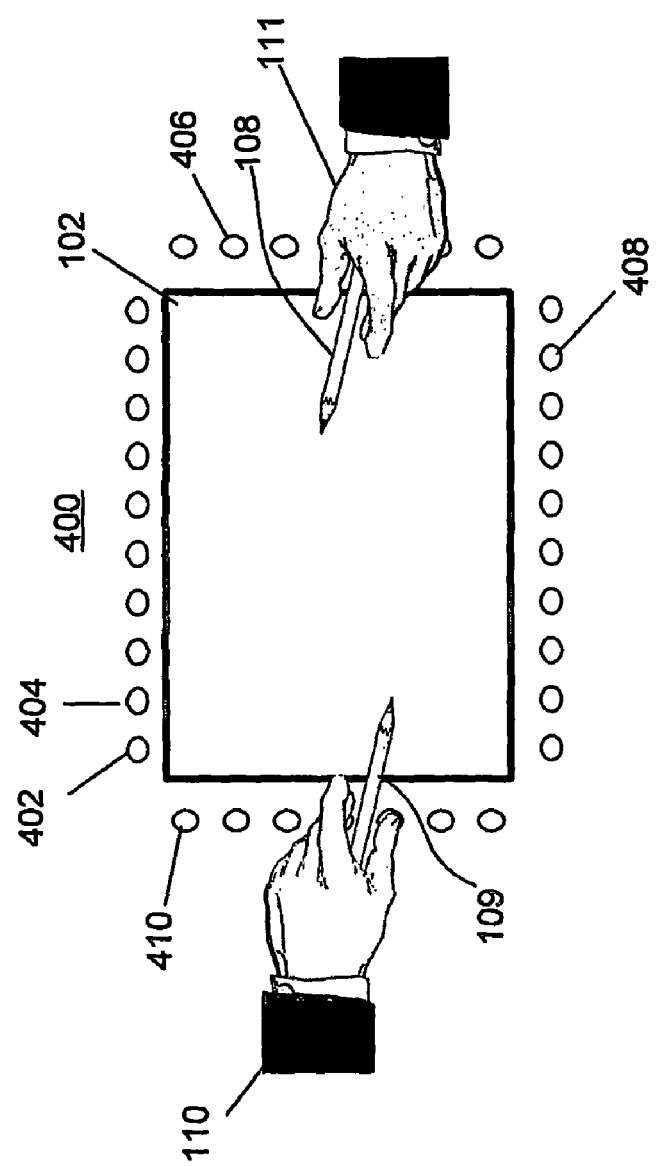
Figures 5A, 5B:
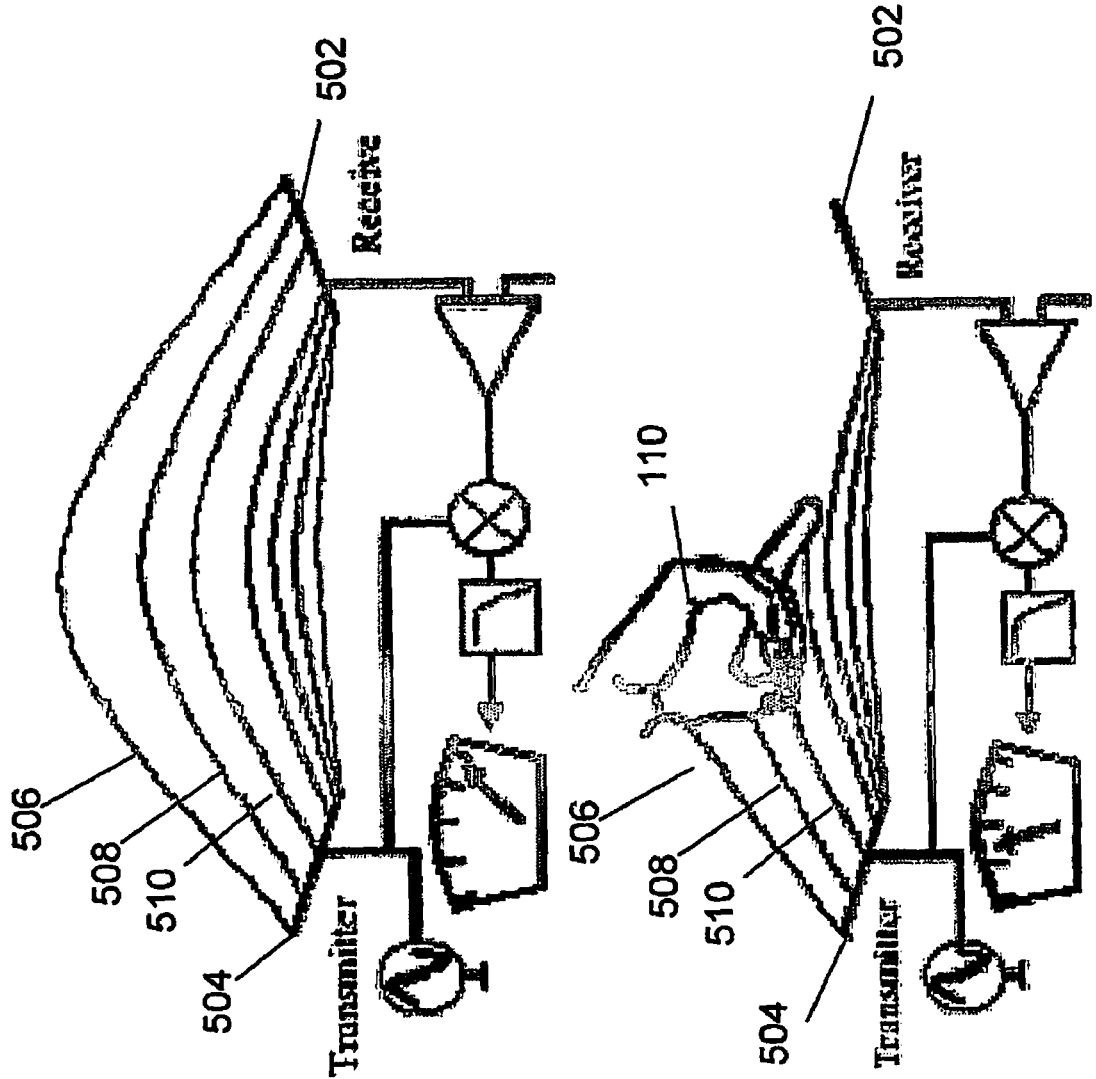
Figure 6:
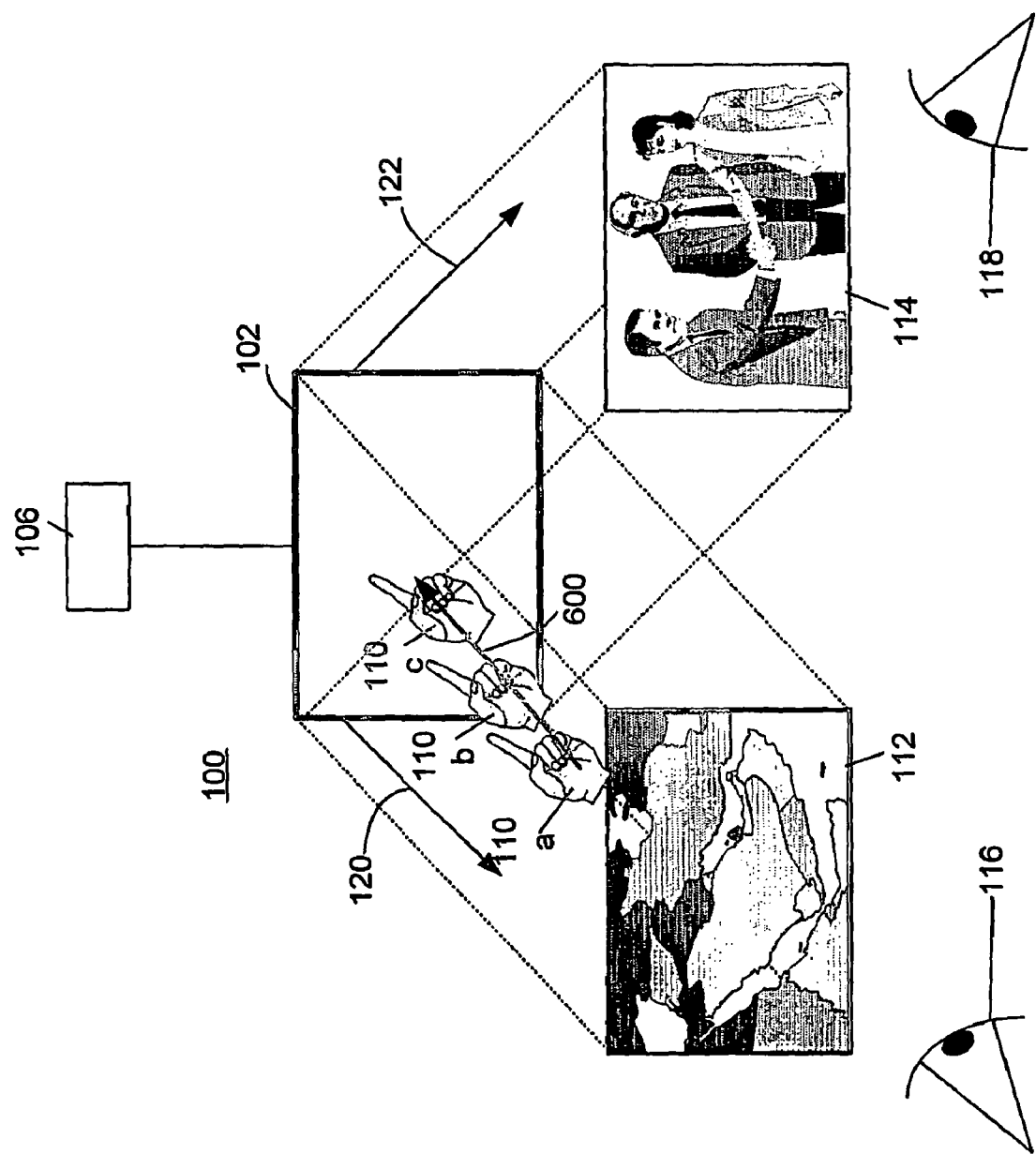
Figure 7:
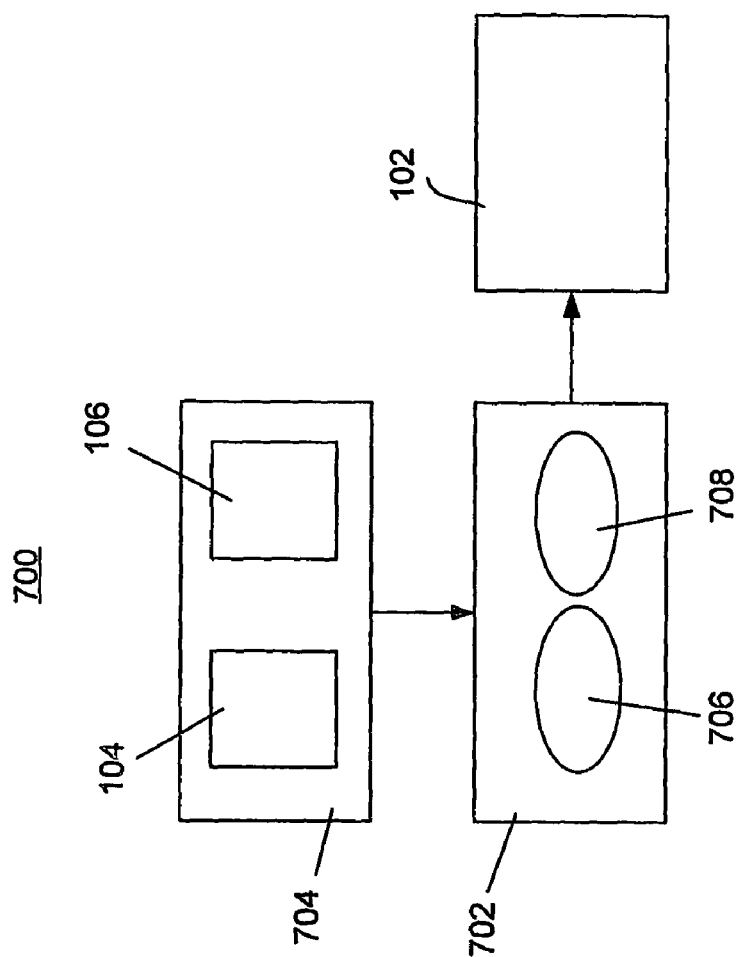

These and other aspects of the display system, of the apparatus and of the vehicle according to the invention will become apparent from and will be elucidated with respect to the implementations and embodiments described hereinafter and with reference to the accompanying drawings, wherein:

FIG. 1 schematically shows an embodiment of the display system according to the invention and two users;

FIG. 2 schematically shows that by rotating the display device the user can select one of the views;

FIG. 3A schematically shows that the position of the user relative to the display device is determined by means of imaging the environment;

FIG. 3B schematically shows a mobile phone comprising a display system according to the invention;

FIG. 4A schematically shows a display system according to the invention comprising a number of sensing means being disposed adjacent to the display device;

FIG. 4B schematically shows an apparatus comprising the display system according to the invention comprising a number of sensing means being disposed adjacent to the display device;

FIG. 4C schematically shows the inside of a car, with the display system according to the invention being located in the dash-board of the car;

FIG. 4D schematically shows an apparatus comprising the display system according to the invention, which has to be controlled by means of a pointing device;

FIG. 5A and FIG. 5B schematically show the concept of cross capacitance sensing;

FIG. 6 schematically shows an embodiment according to the invention which is arranged to determine a trajectory of a hand of an user; and FIG. 7 schematically shows a display system according to the invention whereby the observation means and user-input means are combined.

Same reference numerals are used to denote similar parts throughout the figures.

FIG. 1 schematically shows an embodiment of the display system 100 according to the invention and two users 116 and 118. The display system 100 comprises:

- a display device 102 being arranged to generate a first view 112 in a first direction 120 relative to the display device 120 and to generate a second view 114 in a second direction 122 relative to the display device 102, the second direction 122 being different from the first direction 120;
- user-input means 104 for accepting user-input by means of detecting a position of a hand 110 of an user or of a pointing device 108 held by the band, the position relative to the display device 102. The user-input means 104 are arranged to control the first view 112 and the second view 114 on basis of the detection of the position of the hand 110 of or of the pointing device 108; and
- observation means 106 for observation of the users 116 and 118. The observation means 106 are arranged to detect whether the user-input is provided to control the first 112 view or the second view 114.

The display device 102 comprises one or more luminance modulation units to visualize respective sequences of images being provided by means of multiple image sources. In the case of a single luminance modulation unit temporal or spatial multiplexing is applied to render the images of the respective sequences. Typical image source are a DVD player, a receiver for receiving broadcast images, a set-top box, a satellite-tuner, a VCR player or a computer being arranged to render graphical images. The luminance modulation units can be based on know display technologies like CRT (Cathode Ray Tube), LCD (Liquid Crystal Display) or PDF (Plasma display panel). The display device 102 further comprises optical means to direct a first sequence of images into a first direction 120 resulting in a first view and to direct a second sequence of images into a second direction 122. The first of the views can be seen by the first user 116 and the second view can be seen by the second user.

The user input-means 104 might be a so-called touch-screen. Typically a touch-screen is based on measuring local changes in electrical capacitance or resistance. It comprises two electrodes being disposed parallel with the display device 102. By pushing on one of the electrodes the distance between the electrodes is decreased locally, resulting in a change of the local electrical capacitance or resistance.

The user input-means 104 might comprise sensing electrodes being arranged in an active matrix or around the edge of the display device. See the description in connection with FIG. 5 for a brief explanation of this technology.

The user input-means 104 might comprise other types of detection means, e.g. pairs of ultra-violet or infra-red or ultra-sound transmitters and receivers, being disposed at opposite edges of the display device 102.

The observation means 106 is arranged to inspect the users 116 and 118 by means of imaging the environment in front of the display device 102. The working of these observation means is as follows. It is assumed that a first user 116 is located left from the display device 102 and a second user 118 is located right from the display device 102. The first user 116 is able to watch the first view 112 and the second user 118 is able to watch the second view 114. At a certain moment in time the first user wants to control the application which corresponds to the first view 112. So, the first user moves his hand 110 towards the display device 102 to put his finger at or close to the position of the display device 102 which represents an active user-interface control gadget. In the meantime the hand 110 of the user is imaged. The orientation 123 of the hand 110 is determined by means of image analysis. The determined orientation 123 of the hand is compared with the first direction 120 and the second direction 122 of the display system. If the angle between the determined orientation 123 of the hand and the first direction 120 is less small than the angle between the determined orientation 123 of the hand and second direction 122, then it is assumed that the user-input is provided to control the first 112 view and consequently the appropriate application is controlled. If the angle between the determined orientation 123 of the hand and the first direction 120 is bigger than the angle between the determined orientation 123 of the hand and second direction 122, then it is assumed that the user-input is provided to control the second view 114 and consequently the other application is controlled.

Optionally, the observation means 106 are also arranged to determine the orientation of the lower-arms of the users 116 and 118.

Optionally, the users 116 and 118 make use of pointing devices, e.g. 108 to provide user-input to the display system 100.

FIG. 2 schematically shows that by rotating the display device 102 the user 116 can select one of the views. In connection with FIG. 1 it is described that a display system 100 is shared by multiple users, e.g. two users. In the case of FIG. 2, a display system is used by a single user which is alternatingly watching the views 112-114 being generated by the display device 102. The user can "switch" from a first view 112 which is generated in a first direction 120 to a second view 113 which is generated in a second direction 121 by pivoting the display system. This method of selecting one of the views 112-114 is particular interesting in the case of a mobile system like a PDA. A first view 112 might correspond to a calculator, a second view 113 might correspond to a map and a third view 114 might correspond to a calendar manager.

FIG. 3A schematically shows that the position of the user 116a-116c relative to the display device 102 is determined by means of imaging the environment. Suppose there is one user which is using the display device as described in connection with FIG. 2. In order to determine to which of the views 112-114 the user is watching at a particular moment the display system comprises a camera 106 which is arranged to image the user in its environment. The camera 106 comprises a wide-angle lens (or fish-eye lens) to image the scene comprising the user, with an angle of approximately 180°. Determining to which of the views 112-114 the user is watching means that the angle of a vector 220-222 from the display device 102 to one of the eyes 116a-116c has to be estimated. Suppose that the user 116a is watching view 112 then the display device is pivoted such that the vector 220 from the display device 102 to one of the eyes 116a substantially corresponds to the direction 120 of the first view. If an image is captured by the camera 106 at that moment it will look like a first image 304. The first image 304 comprises a representation of the user 306 and of his hand 308. The relative position of the representation of the user 306 in the first image 304 is related to the position of the user relative to the display device.

If an image is captured at the moment that the user is watching the second view 113 it will look like a second image 302 and if an image is captured at the moment that the user is watching the third view 114 it will look like a third image 300.

To determine the relative position of the representation of the user 306 in the first image the image display system comprises image analysis means. For detection of faces in images several algorithms exist. Many of these algorithms are based on skin-tone detection. Others are based on detection of particular shapes, e.g. circles and ellipses. Besides that, it is possible to make use of local differences in sharpness in the acquired images. The user 116 will be closer to the camera than other objects in his environment. Hence, the representation of the user 306 in the first image will be relatively sharp compared with other objects in the first image.

FIG. 3B schematically shows a mobile phone 320 comprising a display system according to the invention as described in connection with FIG. 3A. The mobile phone 320 comprises a display device 102 being arranged to generate multiple views and a camera 106 for imaging the user.

FIG. 4A schematically shows a display system 400 according to the invention comprising a number of sensing means 402-410 being disposed adjacent to the display device. The sensing of the sensing means 402-410 might be based on acoustic, ultra-violet or radio frequency waves. The sensing means are arranged to detect the presence of an object in their vicinity. If e.g. one of the sensors 406 which is disposed at the left side of the display device 102 detects the presence of an object, then the application which controls the view in the corresponding direction is provided with user-input.

Sensing means based on light are commercially available, e.g. at IVO GmbH & Co. Typically these optical sensing means are arranged to measure a distance. These sensing means are so-called proximity detectors. The appliance of these sensing means in the display system according to the invention is as follows. If e.g. a hand is put in the neighborhood of the display device 102 in order to provide the display system with user input then one or multiple of the sensors detect that there is an object close to the one or multiple sensors. So, each of the sensors measures the distance of objects in their respective neighborhoods. If one of the measured distances is below a predetermined threshold and user-input is accepted by means of the user-input means at the same time then it is easily detected for which of the applications the user input is required.

Sensing means based on ultra-sound are also commercially available. FIG. 4B schematically shows an apparatus 420 comprising the display system 400 according to the invention, comprising a number of sensing means 406-410 being disposed adjacent to the display device 102. The display system 400 further comprises a (not depicted) touch-sensitive screen being placed in front of the display device 102. The apparatus 420 further comprises a keyboard as user-input means. The apparatus 420 further comprises a processor on which multiple applications can run simultaneously. A particular application which can be executed by the processor is a game for two players. When playing that game it is relevant that each of the players has its own private view. That means that the first player is not allowed to see the view of the second player and vice versa. An example of such game is "stratego". The first player is located right from the display device 102 and the second player is located left from the display device 102. The players have to provide userinput by means of touching the touch-sensitive screen. At the moment that the touch-sensitive screen registers user-input both the first array of ultra-sound sensors 406 which is located right from the display device 102 and the second array of ultra-sound sensors 410 which is located left from the display device 102 perform a distance measurement. If one of the elements of the first array of ultra-sound sensors 406 measures a first distance between the one of the elements and an object in its measurement field, which is less than other distances being measured by the elements of the second array of ultra-sound sensors 410 then the userinput is assumed to be provided by the first player and the application is controlled consequently. Similarly, if one of the elements of the second array of ultra-sound sensors 410 measures a second distance between the one of the elements and an object in its measurement field, which is less than other distances being measured by the elements of the first array of ultra-sound sensors 406 then the user-input is assumed to be provided by the second player and the application is controlled consequently.

FIG. 4C schematically shows the inside of a car, with the display system 400 according to the invention being located in the dash-board of the car. FIG. 4C shows the view 424 on the road in front of the car, the steering-wheel 422 of the driver and a mirror 426. The mirror 426 is optional. Alternatively the display system 400 provides a first view to the driver of the car which corresponds to images being captured by a camera which is located such that the scene behind the car can be imaged. The display system 400 comprises sensing means 402-410 as described in connection with FIGS. 4A and 4B. Besides that, the display system 400 comprises cameras 106a-106b being located in the ceiling and/or wall of the car. These cameras 106a-106b are designed to observe the environment in front of the display device 102. If one of the cameras 106a-106b images an arm 412 or 416 the orientation 414, 418 is determined. The determined orientation 414 or 418 is compared with the directions of the views of the display device 102, as described in connection with FIG. 1. On basis of the measurements of the sensing means 402-410 and the image analysis of the images captured by the cameras 106a-106b the display system 400 is arranged to determine which of the persons in the car, i.e. the driver or the passenger being seated next to him, has provided userinput.

FIG. 4D schematically shows an apparatus comprising the display system 400 according to the invention which has to be controlled by means of pointing devices 108-109.

Instead of using a finger-tip to touch a touch-sensitive screen, in many cases it is advantageous to use a device with a sharper top, i.e. a pointing device 108-109. Detection of the presence of a hand 110-111 which holds such a pointing device 108-109 can be achieved similar to what has been described above. That means that the display systems according to the invention can be applied in the case that the users have a pointing device in their hand to provide user-input and in the case that they do not make use of such a pointing device.

FIGS. 5A and 5B schematically show the concept of cross capacitance sensing. FIG. 5A shows a simple combination of two electrodes 502-504 forming a capacitor, with a capacitive current flowing between them. FIG. 5B shows the same two electrodes 502-504 whereby a hand 110 is placed near the electrodes 502-504. Some of the field lines 506-510 are terminated on the hand and the current is decreased relative to the current which flows in the case without the hand 110 being placed near the electrodes, like in FIG. 5A. A measurable effect can be obtained in which the spatial range is roughly equivalent to the separation between the electrodes 502-504. Arrays of multiple electrodes offer rich possibilities for object and gesture recognition. For instance, n transmitters and n receivers arranged around the edge of a display contain n2 electrode pairs at many different separations. See for more details the article "3D Touchless Display Interaction", by C. van Berkel, in SID Proceedings International Symposium, vol. 33, number 2, pp 1410-1413, 2002.

FIG. 6 schematically shows an embodiment according to the invention which is arranged to determine a trajectory 600 of a hand of an user. By localizing the positions 110a-110c of a hand as function of time a trajectory 600 of movement can be computed. The localization of the different positions 110a-1110c of the hand might be based on images being captured as described in connection with FIG. 1, distances being measured as described in connection with FIGS. 4A and 4B, or based on differences in electrical fields as described in connection with FIGS. 5A and 5B. The trajectory 600 of the hand is compared with the first 120 and second 122 view of the display device 102. The best matching direction corresponds to the view which is controlled as a result of user-input being accepted in a predetermined time interval after the computation of the trajectory 600 has finished.

FIG. 7 schematically shows a display system 700 according to the invention, comprising:
  a display device 102 being arranged to generate a first view in a first direction relative to the display device and to generate a second view in a second direction relative to the display device;
  user-input means 104 for accepting user-input by means of detecting a position of a hand of an user or of a pointing device held by the hand, relative to the display device. The user-input means 104 are arranged to control a first application 706 corresponding to the first view and to control a second application 708 corresponding to the second view on basis of the detected position;
  observation means 106 for observation of the user and arranged to detect whether the user-input is provided to control the first application 706 or the second application 708, on basis of the observation; and
  computing means for running the first 706 and the second 708 application.

The observation means 106 and the user-input means 104 are combined. Or in other words, the user-input means 104 and observation means 106 share a number of components. That means that the display system 700 according to the invention, has means 20 704 which are arranged to determine to which part of the display device 102 is pointed to, at a particular moment and to determine what the relative position is of the person who is pointing to the display device 102 at that particular time. These means 704 are e.g. arranged to determine the position of the finger-tip and to estimate the orientation of the hand. This can for example be based on a number of images taken from different directions. This is disclosed in the article "Driving a 3D Articulated Hand Model in Real-Time using video Input", by J. Segen and S. Kumar, in proceedings of Tenth Image and Multidimensional Digital Signal Processing Workshop, Alpbach, Austria, July 1998. Alternatively, both parameters, i.e. location of the finger-tip and orientation of the hand are determined by means of electromagnetic fields as disclosed in the article "3D Touchless Display Interaction", by C. van Berkel, in SID Proceedings International Symposium, vol. 33, number 2, pp 1410-1413, 2002. By applying a number of well disposed ultrasound sensors the same result can be achieved. Notice that in various medical equipment, transducers are applied which provide data to reconstruct three dimensional image data sets.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A display system (100,400,700), comprising:
   a display device (102) being arranged to generate a first view (112) in a first direction relative to the display device (102) and to generate a second view (114) in a second direction relative to the display device (102), the second direction being different from the first direction; and
   user-input means (104) for accepting user-input by means of detecting a position of a hand (110, 111) of at least one user (116) or of a pointing device held by the hand, the position relative to the display device (102), the user-input means (104) being arranged to control the first view (112) and the second view (114) on basis of the detection, characterized in further comprising observation means (106) for observation of said, at least one user (116) and for detecting whether the user-input is provided to control the first view (112) or the second view (114), on basis of the observation and the first direction.

2. A display system (100,400,700) as claimed in claim 1, characterized in that the observation means (106) are arranged to determine an orientation (123, 124) of the hand (110, 111) of said, at least one user (116) relative to the display device (102) and to determine whether a first angle between the orientation (123, 124) of the hand (110, 111) and the first direction is less than a first predetermined threshold.

3. A display system (100,400,700) as claimed in claim 1, characterized in that the observation means (106) are arranged to determine an orientation (414, 418) of the wrist and/or lower arm of the user (116) relative to the display device (102) and to determine whether a second angle between the orientation (414, 418) of the wrist and/or lower arm and the first direction is less than a second predetermined threshold.

4. A display system (100,400,700) as claimed in claim 1, characterized in that the observation means (106) comprise computing means to compute a trajectory (600) of the hand (110a-110c) on basis of a number of detected positions of the hand (110a-110c) and to determine whether a third angle between a vector which represents the trajectory (600) of the hand (110a-110c), and the first direction is less than a third predetermined threshold.

5. A display system (100,400,700) as claimed in claim 1, characterized in that the observation means (106) are arranged to determine the position of the eyes of said, at least one user (116) relative to the display device (102) and to determine whether a fourth angle between a direction of a vector from the display device (102) to a first one of the eyes and the first direction is less than a fourth predetermined threshold, 6. A display system (100, 700) as claimed in claim 1, characterized in that the observation means (106) comprise optical means for imaging said, at least one user (116).

7. A display system (400,700) as claimed in claim 1, characterized in that the observation means (106) are arranged to observe said, at least one user (116) on basis of acoustic, ultraviolet or radio frequency waves.

8. A display system (400,700) as claimed in claim 7 characterized in that the observation means (106) are located adjacent to the display device (102).

9. A display system (400,700) as claimed in claim 1, characterized in that the observation means (106) are arranged to observe said, at least one user (116) on basis of measuring temperature differences.

10. A display system (100,400,700) as claimed in claim 1, characterized in that the user-input means (104) comprise the observation means (106).

11. An apparatus (320, 420) comprising the display system (100,400,700) as claimed in claim 1.

12. An apparatus (420) as claimed in claim 11, characterized in that it is a personal digital assistant.

13. An apparatus (320) as claimed in claim 11, characterized in that it is a mobile phone.

14. A vehicle (440) comprising the display system (100, 400,700) as claimed in claim 1.

15. A vehicle (440) as claimed in claim 14, characterized in that it is a car.

16. A display system (100,400,700) as claimed in claim 1, wherein said user-input means (104) are directed at controlling multiple applications.

17. A display system (100,400,700) as claimed in claim 1, wherein said user-input means (104) for accepting user-input comprises means of detecting the position of the hands (110, 111) or pointing devices held by said hands of a plurality of users (116); and, said observation means comprises means for observing a plurality of users (116).

18. A display system (100, 400, 700) as claimed in claim 17, wherein said user-input means (104) are directed at controlling multiple applications.

* * * * *